(12) United States Patent
Kong

(10) Patent No.: US 9,873,215 B2
(45) Date of Patent: Jan. 23, 2018

(54) APPARATUS FOR MANUFACTURING CRASH PAD

(71) Applicants: Hyundai Motor Company, Seoul (KR); Kia Motors Corporation, Seoul (KR)

(72) Inventor: Byung-Seok Kong, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 247 days.

(21) Appl. No.: 14/955,890

(22) Filed: Dec. 1, 2015

(65) Prior Publication Data

US 2016/0263786 A1 Sep. 15, 2016

(30) Foreign Application Priority Data

Mar. 10, 2015 (KR) ........................ 10-2015-0033391

(51) Int. Cl.
| | |
|---|---|
| B29C 44/12 | (2006.01) |
| B29C 45/16 | (2006.01) |
| B29C 69/02 | (2006.01) |
| B29C 44/02 | (2006.01) |
| B29K 75/00 | (2006.01) |
| B29K 105/04 | (2006.01) |
| B29L 31/30 | (2006.01) |

(Continued)

(52) U.S. Cl.
CPC ...... *B29C 44/1233* (2013.01); *B29C 45/1628* (2013.01); *B29C 45/1671* (2013.01); *B29C 69/02* (2013.01); *B29C 44/02* (2013.01); *B29C 45/14221* (2013.01); *B29C 69/001* (2013.01); *B29K 2075/00* (2013.01); *B29K 2105/04* (2013.01); *B29L 2031/3005* (2013.01)

(58) Field of Classification Search
CPC .. B29C 44/1233; B29C 45/1628; B29C 69/02
See application file for complete search history.

(56) References Cited

U.S. PATENT DOCUMENTS

| | | | | |
|---|---|---|---|---|
| 8,932,038 | B2 * | 1/2015 | Kong | .................. B29C 45/2608 425/112 |
| 9,364,971 | B2 * | 6/2016 | Kong | .................. B29C 33/0038 |
| 9,511,522 | B2 * | 12/2016 | Kong | ...................... B29C 44/18 |

FOREIGN PATENT DOCUMENTS

| | | |
|---|---|---|
| JP | 3521306 B2 | 4/2004 |
| JP | 2009-226951 A | 10/2009 |

(Continued)

*Primary Examiner* — Robert B Davis
(74) *Attorney, Agent, or Firm* — Morgan Lewis & Bockius LLP

(57) ABSTRACT

An apparatus includes a first mold having an injection cavity at a side thereof, for molding of a substrate, a second mold having two injection cores and two skin shaping plugs, and a third mold having a foaming section where a foaming material is injected between a substrate and a skin, and a skin shaping section where embossing is carried out on a skin, wherein, under the condition that the first mold, second mold and third mold are simultaneously closed to one another, a substrate is molded by the injection cavity and a first injection core, embossing is carried out on a skin by one skin shaping plug and the skin shaping section, and, at a same time, the foaming material is injected between a previously molded substrate and a previously embossed skin by a second injection core and foaming section.

2 Claims, 2 Drawing Sheets

(51) Int. Cl.
 *B29C 45/14* (2006.01)
 *B29C 69/00* (2006.01)

(56) References Cited

FOREIGN PATENT DOCUMENTS

| | | |
|---|---|---|
| JP | 2010-120312 A | 6/2010 |
| JP | 2012-179773 A | 9/2012 |
| KR | 10-0599676 B1 | 7/2006 |
| KR | 10-0992638 B1 | 11/2010 |
| KR | 10-0081457 A | 7/2011 |
| KR | 3-0132190 A | 12/2013 |
| KR | 10-1428292 B1 | 8/2014 |

\* cited by examiner

APPARATUS FOR MANUFACTURING CRASH PAD

CROSS-REFERENCE TO RELATED APPLICATION

The present application claims the priority benefit of Korean Patent Application No. 10-2015-0033391, filed Mar. 10, 2015, the disclosure of which is incorporated herein by reference.

CROSS-REFERENCE TO RELATED APPLICATION

The present application claims the priority benefit of Korean Patent Application No. 10-2015-0033391, filed on Mar. 10, 2015, the disclosure of which is incorporated herein by reference.

BACKGROUND OF THE INVENTION

Field of the Invention

The present invention relates to an apparatus for manufacturing a crash pad, and more particularly to an apparatus for manufacturing a crash pad, which includes a first mold formed with an injection cavity at one side thereof, for molding of a substrate, a second mold provided with a pair of injection cores and a pair of skin shaping plugs, and a third mold having a foaming section where a foaming material is injected between a substrate and a skin, and a skin shaping section where embossing is carried out on a skin, wherein, under the condition that the first mold, second mold and third mold are simultaneously closed to one another, a substrate is molded by the injection cavity of the first mold and one injection core of the second mold, embossing is carried out on a skin by one skin shaping plug of the second mold and the skin shaping section of the third mold, and, at the same time, the foaming material is injected between a previously molded substrate and a previously embossed skin by the other injection core of the second mold and the foaming section of the third mold.

Description of Related Art

Generally, a crash pad is installed in a passenger compartment of a vehicle, to cover a front side of the passenger compartment in front of a driver seat and a passenger seat.

In conventional cases, such a crash pad is manufactured using a process as shown in FIG. 1.

That is, a substrate 1 to form a base layer of a crash pad is injection-molded (S1). A skin 2 to be attached to a surface of the substrate 1 is molded, separately from the substrate 1 (S2).

Generally, an outer surface of the skin 2 is embossed through an embossing process, taking into consideration appearance beauty of the crash pad.

Thereafter, the embossed skin 2 is disposed above the substrate 1 formed as mentioned above. A foam 3 made of a polyurethane material is then injected between the substrate 1 and the skin 2 and, as such, a crash pad in which the foam fills a gap between the substrate 1 and the skin 2 is manufactured.

However, the time taken for manufacture of the crash pad through the above-mentioned procedure is about 180 seconds. For this reason, it is necessary to reduce the manufacturing time, for enhancement in productivity.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for manufacturing a crash pad, which is capable of simultaneously performing a process of forming a substrate and a skin and a process of forming a foam between the substrate and the skin, thereby reducing the time taken for manufacture of the crash pad.

In accordance with the present invention, the above and other objects can be accomplished by the provision of an apparatus for manufacturing a crash pad, including a first mold formed with an injection cavity at one side thereof, for molding of a substrate, a second mold provided with a pair of injection cores and a pair of skin shaping plugs, and a third mold having a foaming section in which a foaming material is injected between a substrate and a skin, and a skin shaping section in which embossing is carried out on a skin, wherein, under the condition that the first mold, second mold and third mold are simultaneously closed to one another, a substrate is molded by the injection cavity of the first mold and one injection core of the second mold, embossing is carried out on a skin by one skin shaping plug of the second mold and the skin shaping section of the third mold, and, at the same time, the foaming material is injected between a previously molded substrate and a previously embossed skin by the other injection core of the second mold and the foaming section of the third mold.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
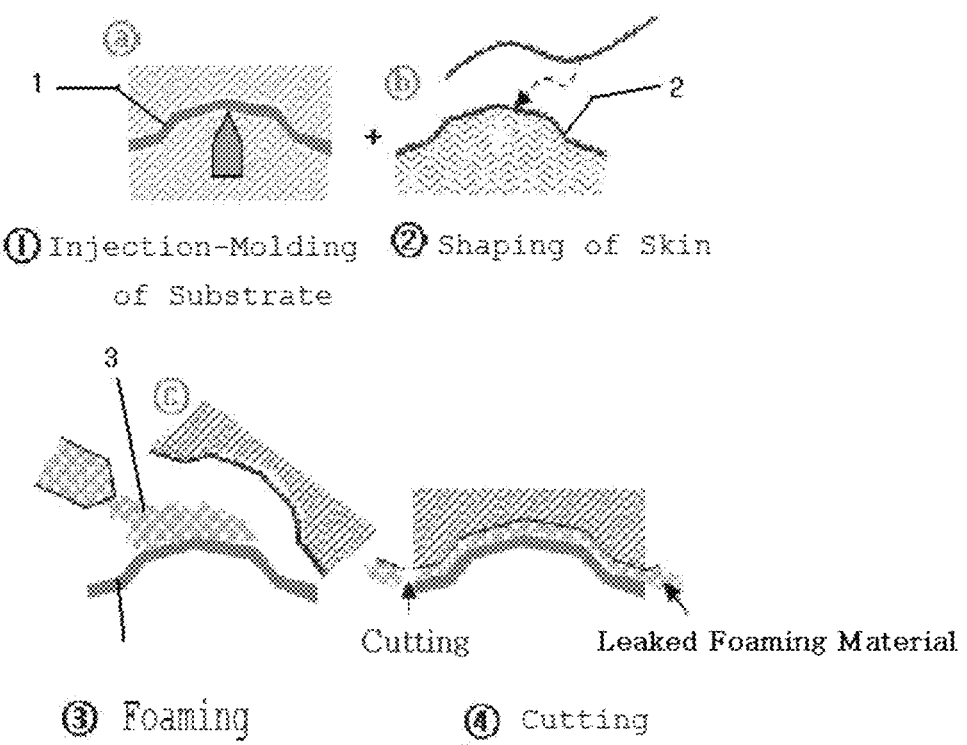
FIG. 1 is a schematic view illustrating a conventional crash pad manufacturing process.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the configuration of an apparatus for manufacturing a crash pad in accordance with the present invention will be described with reference to the accompanying drawings.

Of course, the accompanying drawings are provided as examples for sufficiently detailing the concept of the present invention. Accordingly, the present invention may be embodied in many different forms and should not be construed as limited to the exemplary embodiments set forth herein.

Unless otherwise defined, all terms used herein have the same meaning as commonly understood by one of ordinary skill in the art to which the present invention pertains. Meanwhile, detailed description and illustration of functions and configurations well known in the art may be omitted from the following description and accompanying drawings to avoid obscuring appreciation of the present invention by a person of ordinary skill in the art.

The present invention provides an apparatus for manufacturing a crash pad, including a first mold formed with an injection cavity at one side thereof, for molding of a substrate, a second mold provided with a pair of injection cores and a pair of skin shaping plugs, and a third mold having a foaming section in which a foaming material is injected between a substrate and a skin, and a skin shaping section in which embossing is carried out on a skin, wherein, under the condition that the first mold, second mold and third mold are simultaneously closed to one another, a substrate is molded by the injection cavity of the first mold and one injection core of the second mold, embossing is carried out on a skin by one skin shaping plug of the second mold and the skin shaping section of the third mold, and, at the same time, the foaming material is injected between a previously molded substrate and a previously embossed skin by the other injection core of the second mold and the foaming section of the third mold.

Hereinafter, the configuration of the above-described crash pad manufacturing apparatus according to an exemplary embodiment of the present invention will be described in detail with reference to FIG. 2.

Figure 2:
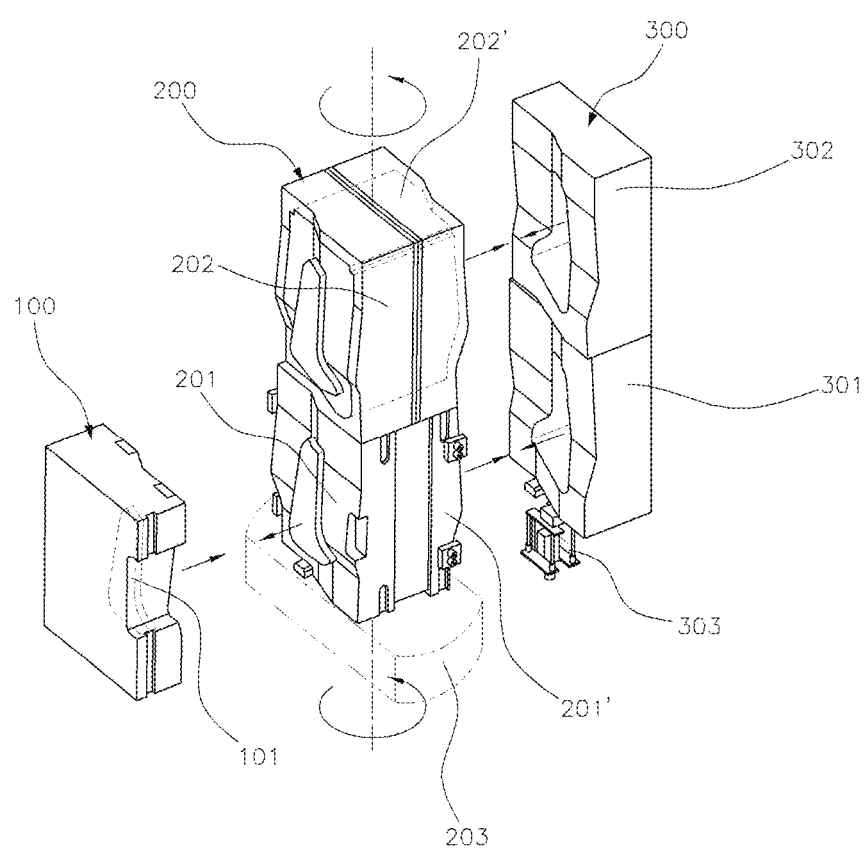
FIG. 2 is a perspective view illustrating a configuration of a crash pad manufacturing apparatus according to the present invention.

Referring to FIG. 2, the crash pad manufacturing apparatus, which is designated by reference numeral "10" includes a first mold 100, a second mold 200, and a third mold 300. The first mold 100 and second mold 200 are arranged to face each other. The second mold 200 and third mold 300 are also arranged to face each other.

The first mold 100 is formed with an injection cavity 101 therein, for molding of a substrate of a crash pad.

The second mold 200 is formed with a pair of injection cores 201 and 201' at a lower portion thereof. The second mold 200 is also formed with a pair of skin shaping plugs 202 and 202' at an upper portion thereof.

The third mold 300 is formed with a foaming section at a lower portion thereof.

The foaming section 301 is a section in which a foam is formed between a substrate and a skin through injection of a foaming material.

In addition, the third mold 300 is formed with a skin shaping section 302 at an upper portion thereof.

The skin shaping section 302 is a section in which embossing is carried out on a surface of the skin under the condition that the section is closed to the skin shaping plugs 202 and 202' of the second mold 200.

In this case, the second mold 200 is installed to be rotatable in a horizontal direction about a vertical axis corresponding to a longitudinal direction thereof by a rotating structure 203.

In addition, a separate foaming material mixing head 303 is mounted to the third mold 300, for injection of a foaming material into the foaming section 301.

A feeding unit is also provided at the third mold 300, to feed a skin shaped at the skin shaping section 302 to the foaming section 301 defined in the lower portion of the third mold 300.

Hereinafter, operation of the crash pad manufacturing apparatus having the above-described configuration according to an exemplary embodiment of the present invention will be described.

First, the crash pad manufacturing apparatus of the present invention initially operates under the condition that a skin has been mounted at the skin shaping section 302 of the third mold 300, for embossing thereof.

Once the crash pad manufacturing apparatus initially operates, the first mold 100 and second mold 200 are closed to each other, and, at the same time, the third mold 300 is closed to the second mold 200 (S1).

As a result, the injection cavity 101 of the first mold 100 is closed to the injection core 201 at one side of the second mold 200. At the same time, the skin shaping section 302 of the third mold 300 is closed to the skin shaping plug 202' at the other side of the second mold 200 (S2).

Subsequently, a synthetic resin is injected into a space defined between the injection cavity 101 of the first mold 100 and the injection core 201 at one side of the second mold 200 under the condition that the injection cavity 101 and injection core 201 are closed to each other and, as such, a substrate is molded (S3). The molded substrate is kept on the injection core 201.

Meanwhile, embossing is carried out on the skin having been mounted at the skin shaping section 302 of the third mold 300 by the skin shaping plug 202' at the other side of the second mold 200 under the condition that the skin shaping section 302 is closed to the skin shaping plug 202' (S4).

In this case, the injection core 201' at the other side of the second mold 200 is also closed to the foaming section 301 of the third mold 300 when the third mold 300 is closed to the second mold 200. In the initial state, however, injection of a foaming material by the foaming material mixing head 303 has not been carried out yet because the skin has not been fed to the foaming section 301 yet.

When embossing of the skin is completed simultaneously with formation of the substrate in accordance with the above-described procedure, the first mold 100 and second mold 200 are again opened from each other. At the same time, the second mold 200 and third mold 300 are opened from each other (S5).

Thereafter, the opened second mold 200 is rotated 180° in a horizontal direction by the rotating structure 203 (S6).

Meanwhile, the embossed skin disposed at the skin shaping section 302 of the third mold 300 is fed to the foaming section 301 of the third mold 300 by the feeding unit provided at the third mold 300, for attachment thereof to the substrate (S7).

After the embossed skin is fed to the foaming section 301 at the lower portion of the third mold 300, a new skin is mounted at the skin shaping section 302 of the third mold 300, which is in an empty state (S8).

Subsequently, the first mold 100 and second mold 200 are again closed to each other, as described above. At the same time, the second mold 200 and third mold 300 are again closed to each other (S9).

In this state, the injection cavity 101 of the first mold 100 is closed to the injection core 201' at the other side of the second mold 200 because the second mold 200 has been rotated 180°. Subsequently, the synthetic resin is injected into a space defined between the injection cavity 101 and the injection core 201', as such, a substrate is molded (S10). The newly molded substrate is kept on the injection core 201' at the other side of the second mold 200.

At the same time, the injection core 201 at one side of the second mold 200, which has been rotated 180° to face the third mold 300, is closed to the foaming section 301 of the third mold 300 while carrying the substrate formed in the previous molding process.

As a result, the embossed skin having been fed to the foaming section 301 of the third mold 300 is disposed to face the substrate kept in the injection core 201 at one side of the second mold 200. In this state, a foaming material is injected into a gap between the skin and the substrate by the foaming material mixing head 303 provided at the third mold 300 and, as such, a crash pad with the foaming material filled between the skin and the substrate is formed (S11).

Meanwhile, the skin shaping plug 202 at one side of the second mold 200, which has been rotated 180° to face the third mold 300, is closed to the skin shaping section 302 of the third mold 300. In this state, embossing is carried out on the skin newly mounted in the skin foaming section 302 (S12).

Thereafter, the first mold 100 and second mold 200 are again opened from each other, and the second mold 200 and third mold 300 are opened from each other (S13). The opened second mold 200 is then rotated 180° (S14). The crash pad completely formed at the foaming section 301 is unloaded outwards from the third mold 300 (S15).

In addition, the embossed skin disposed at the skin shaping section 302 of the third mold 300 is fed to the foaming section 301 of the third mold 300, as described above (S16). A new skin is then mounted at the skin shaping section 302 of the third mold 300, which is in an empty state (S17).

Thereafter, the first mold 100 and second mold 200 are again closed to each other, and the second mold 200 and third mold 300 are again closed to each other. In this state, procedures S9 to S17 are repeatedly carried out, to continuously manufacture crash pads.

The above-described crash pad manufacturing apparatus of the present invention consumes a total time of 90 seconds in procedures of forming a crash pad through formation of a substrate and a skin and injection of a foaming material, a total time of 10 seconds in procedures of closing and opening the molds, and a total time of 10 seconds in procedures of rotating the second mold 200, unloading of a crash pad from the third mold 300, feeding a skin, and mounting a new skin. Accordingly, it may be possible to produce a crash pad within a total time of 110 seconds and, as such, the manufacturing time may be reduced to be greatly shorter than the crash pad manufacturing time in the above-mentioned conventional case, namely, 180 seconds.

As apparent from the above description, in accordance with the crash pad manufacturing apparatus, it may be possible to simultaneously perform a process of forming a substrate and a skin and a process of forming a foam between the substrate and the skin and, as such, the time taken for manufacture of the crash pad may be greatly reduced. Accordingly, there is an effect of achieving an enhancement in productivity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for manufacturing a crash pad, comprising:
   a first mold formed with an injection cavity therein, for molding of a substrate;
   a second mold provided, at a lower portion thereof, with a pair of injection cores while having, at an upper portion thereof, with a pair of skin shaping plugs, the second mold being rotatable about a longitudinal axis thereof by a rotating structure; and
   a third mold having, at a lower portion thereof, a foaming section in which a foam is formed between a substrate and a skin through injection of a foaming material while having, at an upper portion thereof, a skin shaping section in which embossing is carried out on a surface of a skin, the third mold performing an operation of feeding the skin embossed by the skin shaping section,
   wherein, under a condition that the first mold, the second mold and the third mold are simultaneously closed to one another, a substrate is molded by the injection cavity of the first mold and a first injection core of the second mold, embossing is carried out on a skin by one skin shaping plug of the second mold and the skin shaping section of the third mold, and the foaming material is injected between the molded substrate and the embossed skin by a second injection core of the second mold and the foaming section of the third mold, thereby manufacturing a crash pad.

2. The apparatus according to claim 1, wherein a foaming material mixing head is mounted to the third mold, to inject the foaming material.

* * * * *